J. O. Montignani,
Curtain-Cord Tightener,

N° 41,231. Patented Jan. 12, 1864

Witnesses;
Lemuel W. Serrell
Thos. Geo. Harvey

Inventor;
John O. Montignani

UNITED STATES PATENT OFFICE.

JOHN O. MONTIGNANI, OF ALBANY, NEW YORK, ASSIGNOR TO WM. R. HILL.

IMPROVED CORD-TIGHTENER FOR CURTAINS.

Specification forming part of Letters Patent No. 41,231, dated January 12, 1864.

*To all whom it may concern:*

Be it known that I, JOHN O. MONTIGNANI, of Albany, in the county of Albany and State of New York, have invented, made, and applied to use a certain new and useful Improvement in Cord-Tighteners for Curtains; and I do hereby declare the following to be a full, clear, and exact description of the same, reference being had to the annexed drawings, making part of this specification, wherein—

Figure 1:
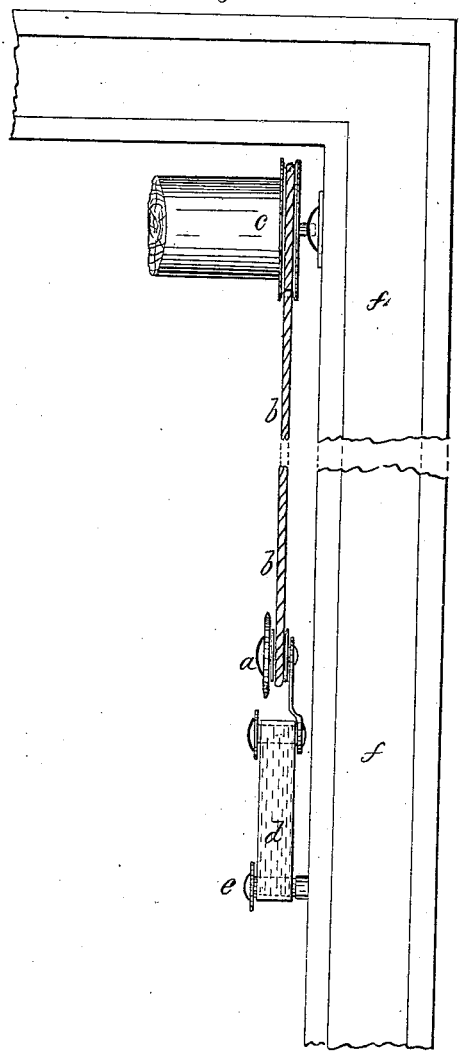
Figure 2:
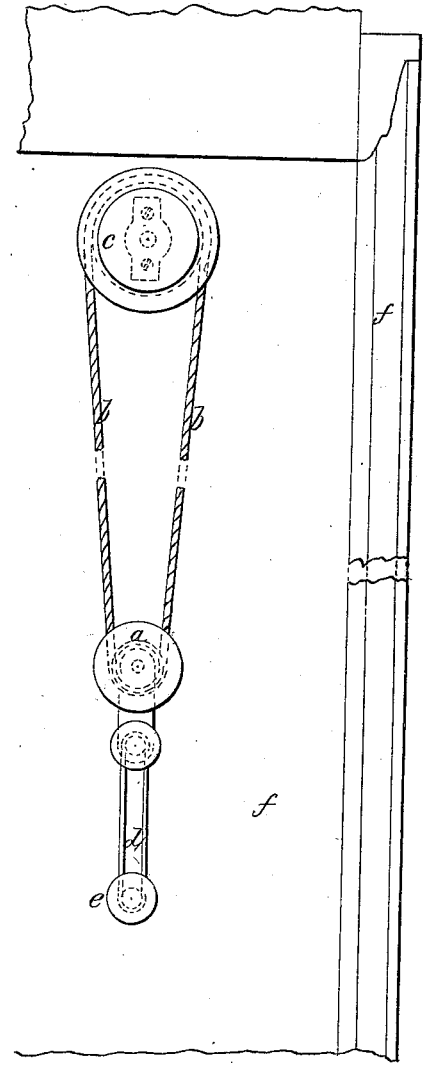

Figure 1 is a side view, and Fig. 2 is an elevation, of said cord-tightener.

Similar marks of reference denote the same parts.

The cords passing from a pulley or rack to the roller on which the curtain is wound are affected by atmospheric changes. If the temperature is warm and the air dry, such cords will slacken and the curtain often run down by its own weight, and the cord will require to be tightened by drawing down the rack-pulley. Then when a cold or damp atmosphere acts on such cords they contract, and either break or stretch so as to be as loose as before when a change of temperature takes place. Thus the cords are speedily destroyed, particularly where they are of considerable length and the ends joined to form an endless cord, as usually employed.

The nature of my said invention consists in a contractile rubber band extending from the strap carrying the pulley or eye to a fixed stud upon the casing or place to which the cord-pulley is to be affixed. This india-rubber band preserves a constant tension upon the cord and causes it always to remain under the proper strain regardless of changes in the atmosphere.

In the drawings, $a$ is a pulley or eye, of any desired character, around which the cord $b$ passes to the roller $c$ or other device to which the curtain is connected. $d$ is an india-rubber spring-band connected at one end to the shell or strap of the pulley or eye, and at the other end to a stud, $e$, affixed in the casing $f$ or place to which the cord-pulley is to be affixed.

This rubber band, extending from a fixed stop to the cord-pulley, is cheap and efficient, keeping the cord under a constant strain, and at the same time allowing the cord to draw the pulley into line with itself, so that the cord may run freely through the pulley or eye.

I do not claim a spring applied to the cord pulley or eye; but

What I claim, and desire to secure by Letters Patent, is—

The india-rubber spring-band $d$, extending from the fixed stud $e$ to the strap or shell carrying the cord pulley or eye, for the purposes and as specified.

In witness whereof I have hereunto set my signature this 30th day of October, A. D. 1863.

JOHN O. MONTIGNANI.

Witnesses:
   LEMUEL W. SERRELL,
   THOS. GEO. HAROLD.